United States Patent
Windle et al.

(10) Patent No.: US 6,751,339 B1
(45) Date of Patent: Jun. 15, 2004

(54) TEXTURE ADVISOR

(75) Inventors: John Richard Windle, Hebersham (AU); Jing Wu, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/451,430

(22) Filed: Nov. 30, 1999

(30) Foreign Application Priority Data

Nov. 30, 1998 (AU) ............................................. PP7437

(51) Int. Cl.⁷ ................................................. G06K 9/00
(52) U.S. Cl. ...................................... 382/108; 345/582
(58) Field of Search .............................. 382/108, 181, 382/140; 345/582

(56) References Cited

U.S. PATENT DOCUMENTS

| | | | | |
|---|---|---|---|---|
| 5,021,876 A | * | 6/1991 | Kurita et al. | 358/450 |
| 5,224,208 A | * | 6/1993 | Miller et al. | 345/426 |
| 5,784,498 A | * | 7/1998 | Venable | 358/448 |
| 5,872,867 A | * | 2/1999 | Bergen | 348/571 |
| 6,381,365 B2 | * | 4/2002 | Murakawa | 382/190 |
| 2001/0046321 A1 | * | 11/2001 | Murakawa | 382/190 |

FOREIGN PATENT DOCUMENTS

| | | | |
|---|---|---|---|
| EP | 0 369 719 A3 | 5/1990 | G06F/15/72 |
| WO | WO 97/06477 | 2/1997 | |
| WO | WO 97/10569 | 3/1997 | G06T/11/40 |

* cited by examiner

*Primary Examiner*—Leo Boudreau
*Assistant Examiner*—Ryan J. Miller
(74) *Attorney, Agent, or Firm*—Fitzpatrick, Cella, Harper & Scinto (57) ABSTRACT

A method and apparatus for determining a texture which best matches an image (100) are provided. The method involves determination of an image feature value from the image (100), and determination of corresponding texture feature values for each member of a set of textures (106, 112). Thereafter the image feature value is compared with the corresponding texture feature values of each member of the set of textures (106, 112) to produce comparison values, from which the best comparison value is selected according to a rule. This best comparison value determines the coresponding desired matching texture.

13 Claims, 7 Drawing Sheets

TEXTURE ADVISOR

FIELD OF THE INVENTION

The present invention relates to the field of image processing, and in particular to a method of selecting texture and/or providing texture advice, which can be used for example, by graphics designers, or by graphic design applications.

BACKGROUND OF THE INVENTION

The aspect of texture combination is a necessary feature in any graphic design. For example, selection of a background texture which complements the texture in a picture, which in turn is part of an overall graphic design, is one example of where a graphic artist is required to select an aesthetically pleasing texture combination. Traditionally, texture selection is performed manually by the graphic artist, based upon skill and experience, and also upon subjective assessment criteria. Clearly although this method will, providing the graphic artist is suitably experienced, yield aesthetically pleasing results, the subjective nature of the method does not provide a basis for consistent or repeatable outcomes, or the possibility of automation.

SUMMARY OF THE INVENTION

In accordance with a first aspect of the present invention there is disclosed a method for determining a texture which substantially best matches at least one image from a set of images, the method comprising the steps of:

(a) determining an overall image feature value from the at least one image;

(b) determining, for each member of a set of textures, a texture feature value corresponding to the overall image feature value, so to form a set of corresponding texture feature values;

(c) comparing the overall image feature value with each member of the set of corresponding texture feature values, so to produce a corresponding set of comparison values; and (d) selecting, from the set of comparison values, a best comparison value according to a first rule, whereby the selected comparison value is associated with the corresponding texture which substantially best matches the at least one image.

In accordance with a second aspect of the present invention there is disclosed a method for determining a texture which substantially best matches a set of images, the method comprising the steps of:

(a) clustering the set of images into groups dependent upon an image feature classification, (b) determining a group image feature value for each group;

(c) determining, for each member of a set of textures, a texture feature value corresponding to each group image feature value, so to form a set of corresponding texture feature values;

(d) comparing, for each group of images, the group image feature value with each member of the set of corresponding texture feature values, so to produce, for each group image feature value, a corresponding set of comparison values;

(e) selecting, for each group of images, from the corresponding set of comparison values, a best comparison value according to a first rule, whereby the selected comparison value is associated with the corresponding texture which substantially best matches the associated group image feature value; and (f) selecting, from the corresponding textures each of which substantially best matches the group image feature value associated with a corresponding group of images, a best texture according to a second rule, said best texture substantially best matching the set of images.

In accordance with a third aspect of the present invention there is disclosed an apparatus for determining a texture which substantially best matches at least one image from a set of images, the apparatus comprising:

(a) first determination means for determining an overall image feature value from the at least one image;

(b) second determination means for determining, for each member of a set of textures, a texture feature value corresponding to the overall image feature value, so to form a set of corresponding texture feature values;

(c) comparison means for comparing the overall image feature value with each member of the set of corresponding texture feature values, so to produce a corresponding set of comparison values; and (d) selection means for selecting, from the set of comparison values, a best comparison value according to a first rule, whereby the selected comparison value is associated with the corresponding texture which substantially best matches the at least one image.

In accordance with a fourth aspect of the present invention there is disclosed an apparatus for determining a texture which substantially best matches a set of images, the apparatus comprising:

(a) clustering means for clustering the set of images into groups dependent upon an image feature classification, (b) first determination means for determining a group image feature value for each group;

(c) second determination means for determining, for each member of a set of textures, a texture feature value corresponding to each group image feature value, so to form a set of corresponding texture feature values;

(d) comparison means for comparing, for each group of images, the group image feature value with each member of the set of corresponding texture feature values, so to produce, for each group image feature value, a corresponding set of comparison values;

(e) first selection means for selecting, for each group of images, from the corresponding set of comparison values, a best comparison value according to a first rule, whereby the selected comparison value is associated with the corresponding texture which substantially best matches the associated group image feature value; and (f) second selection means for selecting, from the corresponding textures each of which substantially best matches the group image feature value associated with a corresponding group of images, a best texture according to a second rule, said best texture substantially best matching the set of images.

In accordance with a fifth aspect of the present invention there is disclosed a computer program product including a computer readable medium having recorded thereon a computer program determining a texture which substantially best matches at least one image from a set of images, the computer program comprising:

(a) first determination steps for determining an overall image feature value from the at least one image;

(b) second determination steps for determining, for each member of a set of textures, a texture feature value corresponding to the overall image feature value, so to form a set of corresponding texture feature values;

(c) comparison steps for comparing the overall image feature value with each member of the set of corresponding texture feature values, so to produce a corresponding set of comparison values; and (d) selection steps for selecting, from the set of comparison values, a best comparison value according to a first rule, whereby the selected comparison value is associated with the corresponding texture which substantially best matches the at least one image.

In accordance with a sixth aspect of the present invention there is disclosed a computer program product including a computer readable medium having recorded thereon a computer program for determining a texture which substantially best matches a set of images, the computer program comprising:

(a) clustering steps for clustering the set of images into groups dependent upon an image feature classification, (b) first determination steps for determining a group image feature value for each group;

(c) second determination steps for determining, for each member of a set of textures, a texture feature value corresponding to each group image feature value, so to form a set of corresponding texture feature values;

(d) comparison steps for comparing, for each group of images, the group image feature value with each member of the set of corresponding texture feature values, so to produce, for each group image feature value, a corresponding set of comparison values;

(e) first selection steps for selecting, for each group of images, from the corresponding set of comparison values, a best comparison value according to a first rule, whereby the selected comparison value is associated with the corresponding texture which substantially best matches the associated group image feature value; and (f) second selection steps for selecting, from the corresponding textures each of which substantially best matches the group image feature value associated with a corresponding group of images, a best texture according to a second rule, said best texture substantially best matching the set of images.

BRIEF DESCRIPTION OF THE DRAWINGS

Three embodiments of the invention are described with reference to the drawings, in which.

DETAILED DESCRIPTION

The texture of an image is described by a number of metrics or measurements associated with the image data, and is a function of one or more of these metrics. Typically metrics associated with image texture include the density of sharp edges which appear in the image, the relative proportion of high frequency components in a Fourier transform of the image, and so on.

The following description, for the sake of example only, is based upon use of sharp-edge density as the texture metric, and uses a gradient value calculation as the method for quantifying the edge density.

Figure 1:
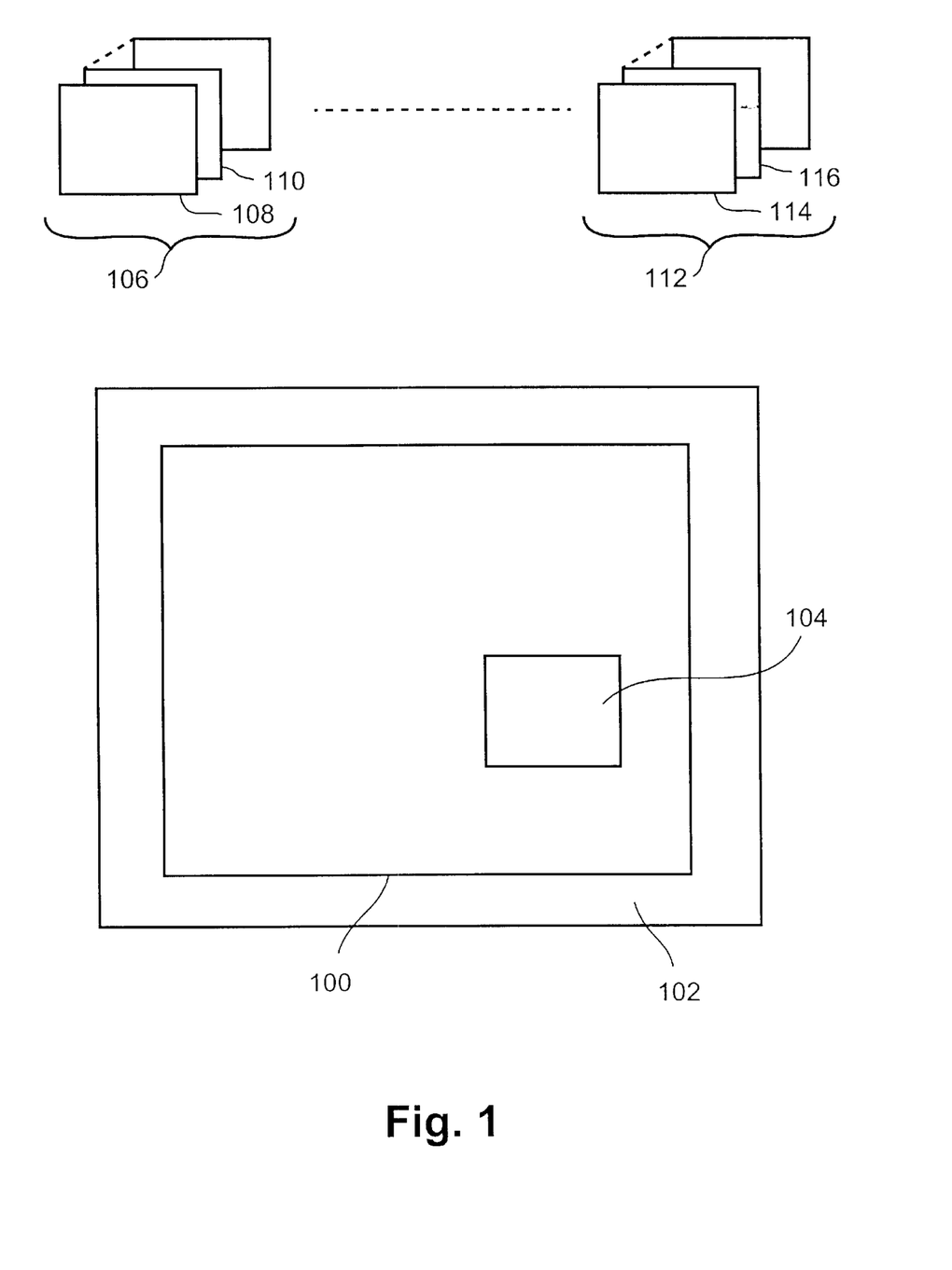
FIG. 1 presents a high level view of one preferred embodiment of the invention.

An overview of one preferred embodiment can be obtained from FIG. 1. The graphic designer, having image 100 for which he or she wishes to select a background texture 102, is able to choose from multiple texture templates 106, 112 and so on. Each texture template, say 106, addresses a particular class of textures. Thus template 106 and its allowable texture options 108, 110 . . . are, say, textures with a strong vertical linear component, and variations on that general theme. On the other hand, template 112 and its associated allowable texture options 114, 116 . . . are textures with a generally circular feature, and various adaptations thereof. The graphic designer in general must therefore select the appropriate template from among templates 106, 112 . . . and select the background texture 102 for his selected image 100. Alternatively, he can select a background texture 102 which instead of generally matching image 100 instead matches a specific region 104 of image 100. A process for achieving the above is presented below with reference to FIG. 3. Before moving to that process however, a brief example using a colour advisor analogy is described in relation to FIG. 2. Colour matching is intuitively understandable, and provides an introduction to the more abstract texture advice process described in relation to FIG. 3.

Figure 2:
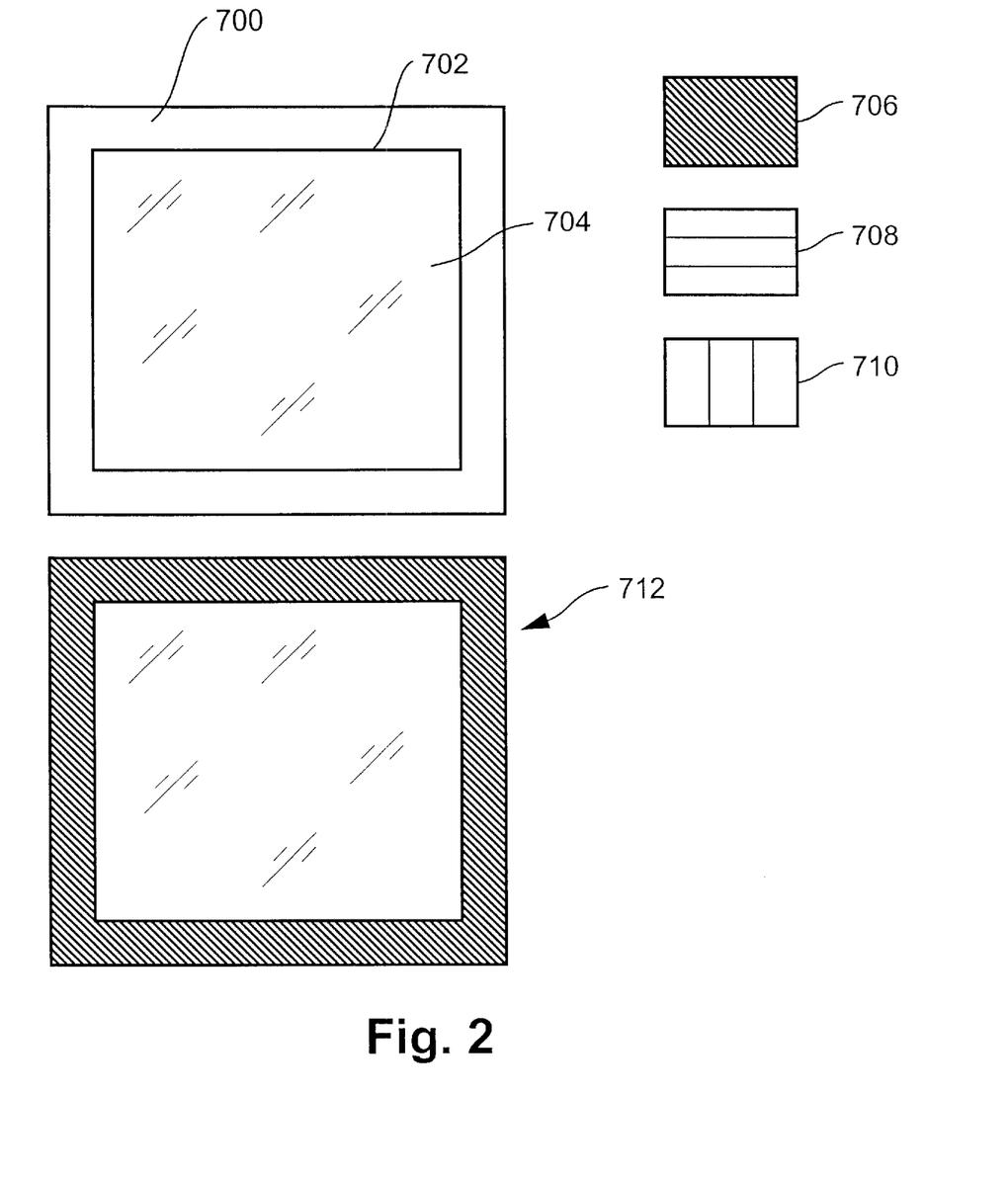
FIG. 2 presents an example of texture matching using a colour matching analogy.

FIG. 2 provides an illustrative example of texture advice, where it is desired to provide a background texture 700 for an image 702, the background texture 700 being determined on the basis of the entire region 704 of the image 702. A number of texture options 706 to 710 are available. The image region 704 consists of a relatively quiet series of line triplets in a diagonal orientation. The available texture options are (i) a "busy" series of lines with an opposing diagonal orientation 706, (ii) a quiet series of horizontal lines 708, and a quiet series of vertical lines 710. Since a rule used for background texture determination is that the background texture 700 should be "contrasting" to the region texture 704, the busy line series 706 is selected for the background 712. The image 702 and the selected contrasting background texture is shown in 712.

Figure 3:
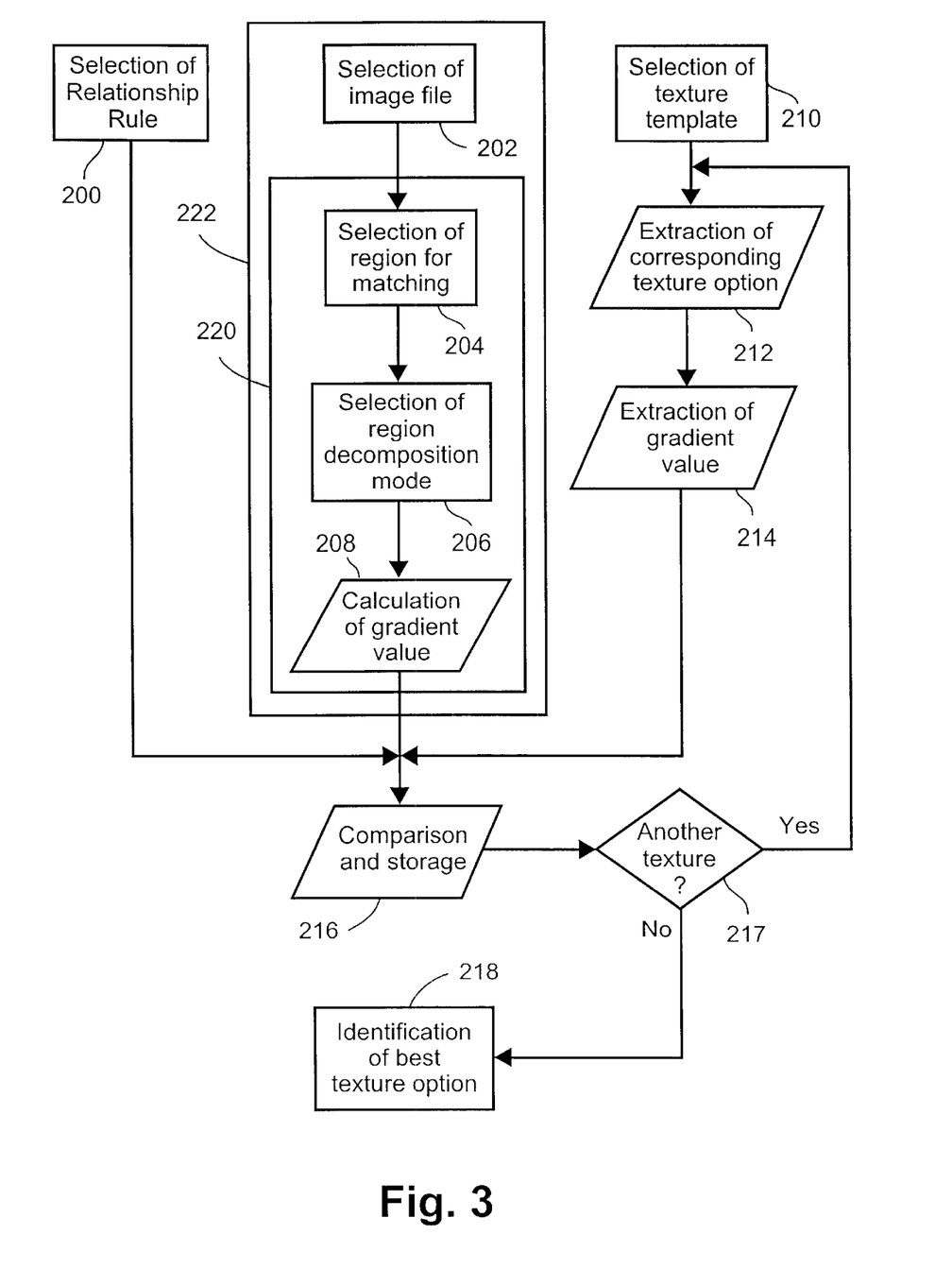
FIG. 3 is a functional process in a first embodiment of the invention.

In the embodiment of FIG. 3, a graphic designer selects the image file of, say, a garden scene in an initial selection step 202. An aesthetically pleasing background texture is now required. In the particular case described, the designer does not wish to use a texture which matches the overall image file which he has selected, but rather a particular region of the image, which is in this example a person's face. The person is, for sake of explanation, taken to be seated in the centre of the more complex visual environment of the garden (100 in FIG. 1). The designer therefore selects the desired region (104 in FIG. 1), namely the person's face for texture matching in selection step 204.

Since the region 104 selected in the selection step 204 is reasonably homogeneous in texture, the designer then decides that the entire region 104 in selection step 206 is the basis for the rest of the procedure. In the alternative, had the region 104 selected in the previous selection step 204 been non-homogeneous, for example had the person's face had a sharp shadow cast partially across it, the artist would have selected a regional decomposition mode in mode selection step 206. This would have resulted in each of the shaded and unshaded portions of the selected face being processed separately. This is described in more detail below with reference to FIG. 5.

Having completed steps 202, 206, the method in step 208 now extracts a gradient value for the selected region 104. This is described in more detail below.

In addition, having selected the image for which a texture is to be identified, the graphic designer also selects a desired relationship rule in step 200. This step defines the desired relationship between the texture to be found, and the selected image. For example, the designer can choose the texture of the background to be similar to the texture of the person's face. Alternatively, since the face is not particularly "busy" in terms of the number of sharp edges for example, the designer can choose a texture which is complimentary, and which is, in contrast, busy in that sense. Thus the "select relationship rule" step 200 defines the nature of the relationship between the image region (104) selected in steps 202–206, and the texture to be found. The relationship can be defined as "similar", or "complimentary" or can be described using other adjectives or phrases.

Having completed steps 202–208, and step 200, the designer at step 210 makes a selection of a particular texture template (106 or 112 in FIG. 1). This texture template is one of many such templates which are available for selection. Associated with each template, are a set of allowable texture options (108, 110, . . . , 114, 116 . . . ) which are either to be calculated in step 212 or read from storage after having been precalculated and stored off line.

A gradient value is then calculated in step 214 for the texture produced in extraction step 212. Each gradient value output from calculation step 214 is then compared with the gradient value calculated in step 208 for the image region, i.e., the face 104, to be matched. Comparison step 216 compares the aforementioned gradient values according to the relationship rule previously selected in step 200 and stores an associated comparison value for each comparison outcome. The comparison between the gradient value calculated for the face in step 208 and the texture gradient value calculated in step 214 is performed by comparison step 216 for a single texture gradient value at a time. After each comparison, step 217 determines whether another texture is available for comparison, in which case the process loops back to step 212 where extraction of the next texture option is performed.

Alternatively, if all texture corresponding to the particular template selected in selection step 210 have now been processed, the process is directed by decision step 217 to identification step 218, where the best texture option is identified. Identification step 218 makes this decision on the basis of the comparison values determined and stored in comparison step 216 when comparing the gradient value for the face (104) with each of the texture options available for the texture template selected in step 210.

Figure 4:
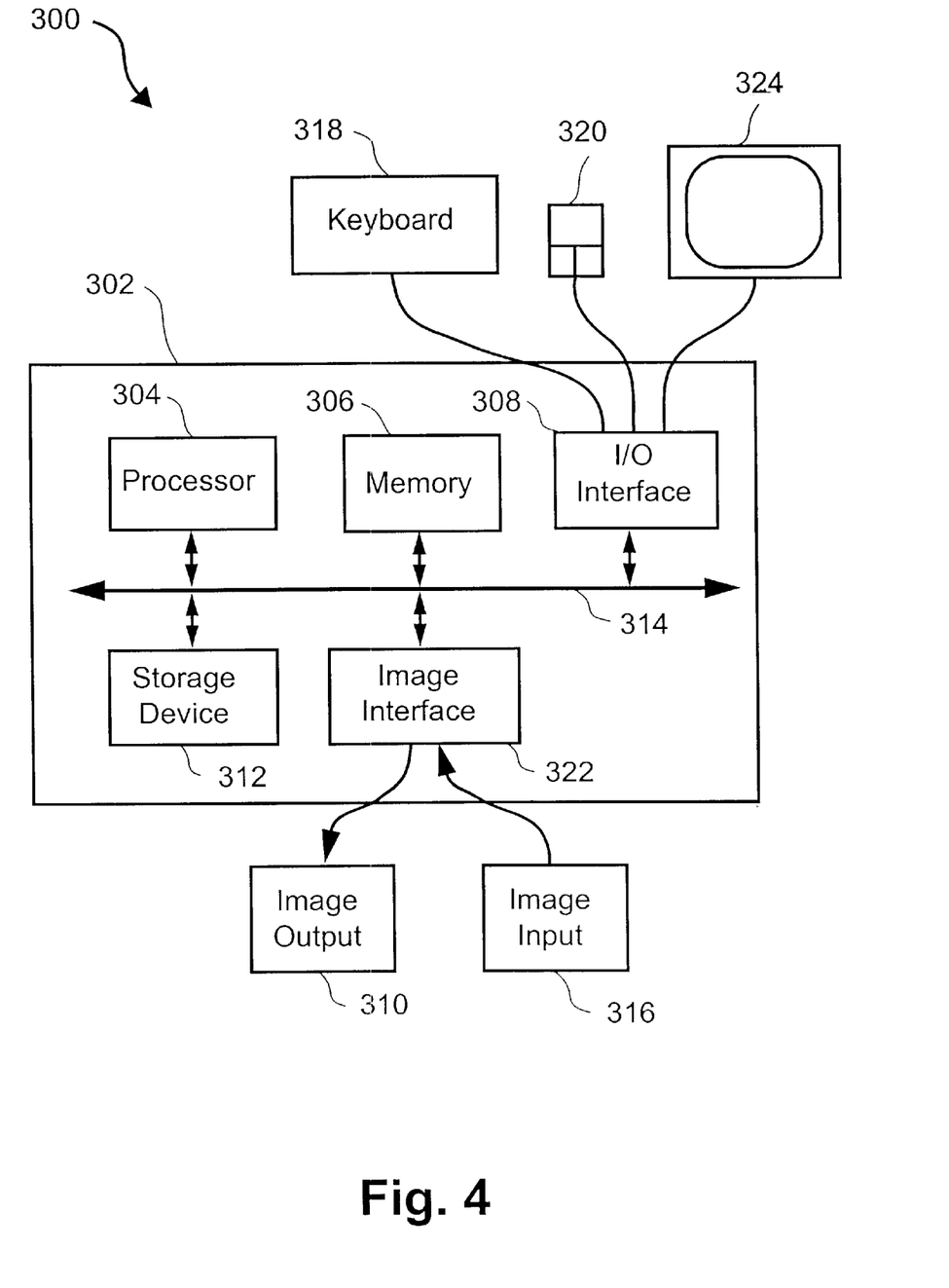
FIG. 4 illustrates a conventional general-purpose computer upon which all the embodiments can be practiced.

FIG. 4 shows how the system is preferably practised using a conventional general-purpose computer 300 wherein the various processes described above are implemented as software executing on the computer 300. In particular, the various process steps are effected by instructions in the software that are carried out by the computer 300. The software is stored in a computer readable medium, is loaded onto the computer 300 from the medium, and is then executed by the computer 300. The use of the computer program product in the computer creates an apparatus for selecting textures which match, according to specified criteria, an image frame or a sub-region of an image frame. The computer system 300 includes a computer module 302, an image input card 316, and input devices 318, 320. In addition, the computer system 300 can have any of a number of other output devices including an image output card 310 and output display 324. The computer system 300 can be connected to one or more other computers using an appropriate communication channel such as a modem communications path, a computer network, or the like. The computer network can include a local area network (LAN), a wide area network (WAN), an Intranet, and/or Internet.

Thus, for example, image frames selected in step 202 (FIG. 3) can be input via image input card 316, control commands can be input via keyboard 318, and/or mouse 320, and selected textures from step 218 (FIG. 3) can be output via image output card 310. Software instructions executing on the computer 300 comprise first determination steps 222 for determining an overall image feature from the at least one image; second determination steps 212, 214 for determining, for each member of a set of textures, a texture feature corresponding to the overall image feature, so to form a set of corresponding texture features; comparing steps 216 for comparing the overall image feature with each member of the set of corresponding texture features, so to produce a corresponding set of comparison values; and selecting steps 218 for selecting, from the set of comparison values, a best comparison value according to a first rule, whereby the selected comparison value is associated with the corresponding texture which substantially best matches the at least one image.

The computer 302 itself includes one or more central processing unit(s) (simply referred to as a processor hereinafter) 304, a memory 306 which can include random access memory (RAM) and read-only memory (ROM), an input/output (IO) interface 308, an image interface 322, and one or more storage devices generally represented by a block 312. The storage device(s) 312 can include one or more of the following: a floppy disk, a hard disk drive, a magneto-optical disk drive, CD-ROM, magnetic tape or any other of a number of non-volatile storage devices well known to those skilled in the art. Each of the components 304, 306, 308, 312 and 322, is typically connected to one or more of the other devices via a bus 314 that in turn can include data, address, and control buses. The image interface 322 is connected to the video input 316 and video output 310 cards, and provides video input from the video input card 316 to the computer 302 and from the computer 302 to the video output card 310.

Figure 5:
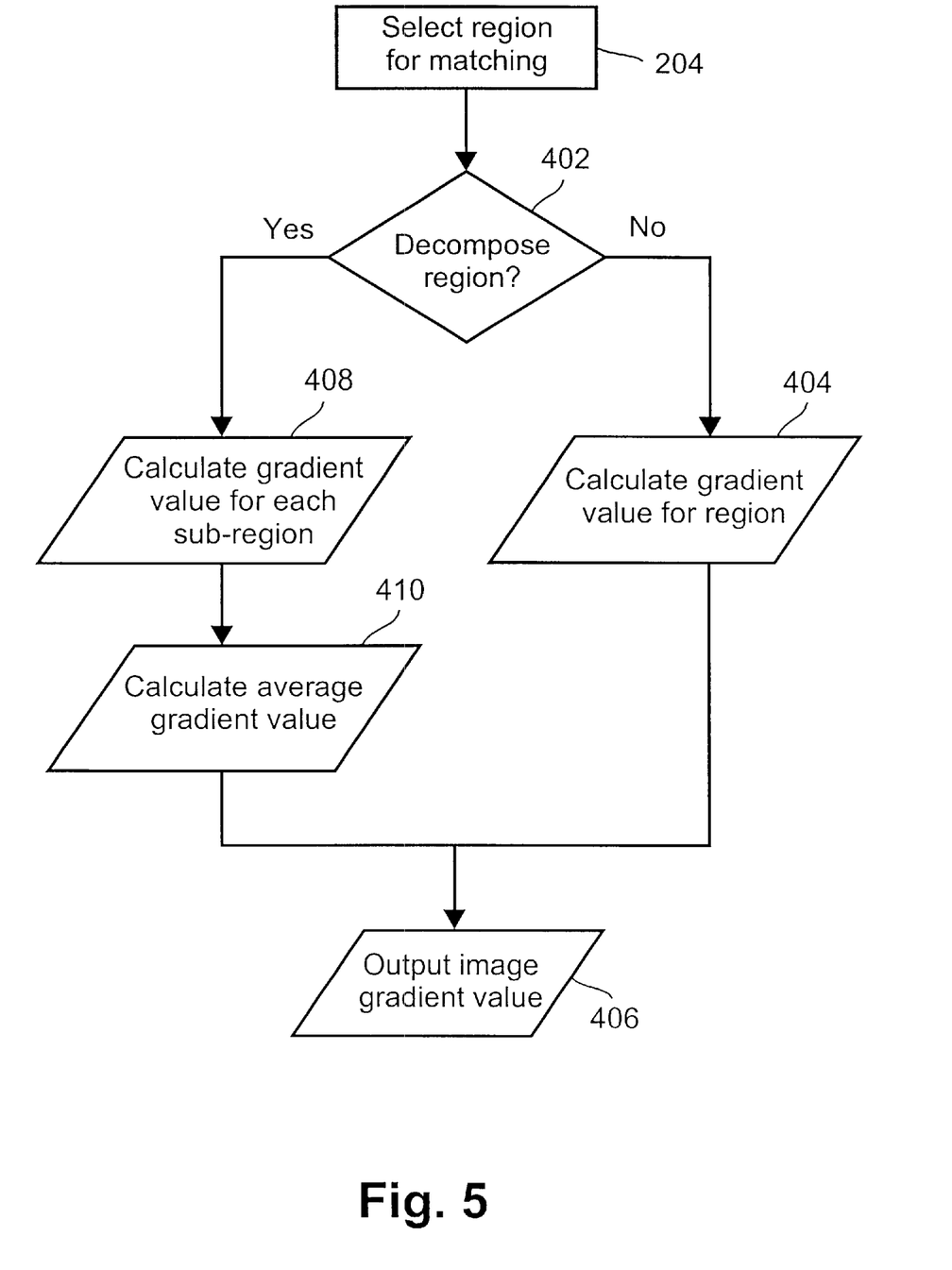
FIG. 5 illustrates a process for handling decomposition of regions to be texture matched.

FIG. 5 illustrates a process for step 220 (ie. steps 204, 206 and 208) of FIG. 3 which carry out calculation of gradient values allowing the ability to decompose the selected region 204. In step 204, the graphic designer selects a region for matching. Thereafter, in step 402 if he chooses not to decompose the region selected, and therefore to select a texture which matches the region as a whole, the process proceeds to step 404 which calculates the gradient value for the overall region. Thereafter, the process proceeds to step 406 where the gradient value for the region is output. Alternatively, at step 402, if the designer chooses to decompose the region in some manner, the process proceeds to step 408, whereby a gradient value is calculated for each subregion into which the region is decomposed. Thereafter, in step 410 an average gradient value is calculated for the region as a whole, this average value being, say, the arithmetic mean of the individual gradient values calculated in step 408. After step 410, the process proceeds to step 406, where the gradient value for the image is output.

Figure 6:
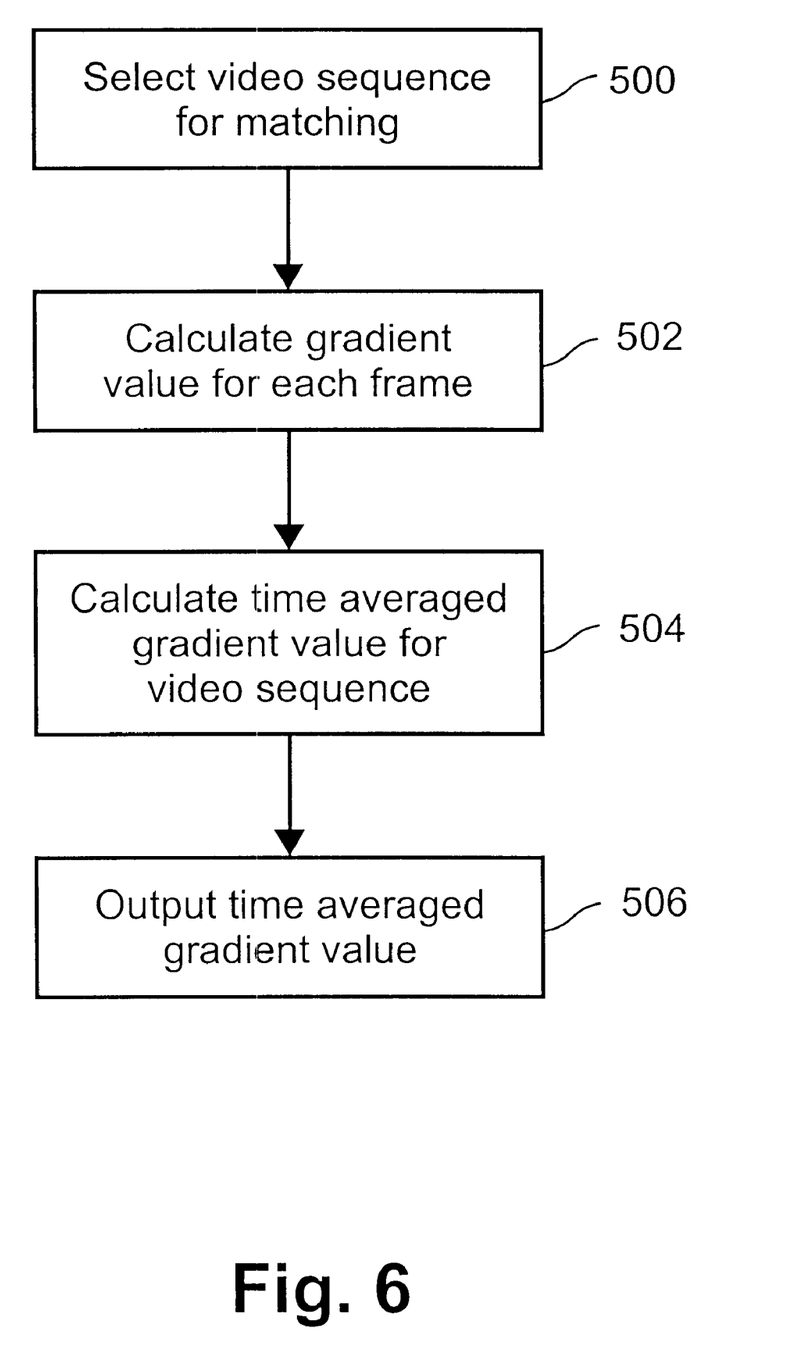
FIG. 6 depicts a process of the second embodiment for matching a texture to a sequence of video images.

FIG. 6 illustrates how the above described process of the first embodiment can be adapted to a second embodiment which identifies a suitable texture which matches not an individual image frame or region as described previously, but rather a sequence of video images. This is done by substituting the process illustrated in FIG. 6 for the process in step 222 in FIG. 3 (which includes steps 202, 204, 206 and 208). In step 500, the designer selects a video sequence for texture matching. Thereafter, in step 502, a gradient value is calculated for each frame which makes up the aforementioned video sequence. Following on this step, in step 504 a time averaged gradient value for the video sequence is calculated, whereby the individual gradient values calculated in step 502 are, say, arithmetically averaged. Finally, in step 506, the time averaged gradient value is output, this value being representative of the video sequence, and thereupon, the process proceeds to step 216 again making reference to FIG. 3.

The method of gradient value calculation used in the preferred embodiment of the invention uses the following operators:

$$Ox = \begin{pmatrix} -1 & 0 & 1 \\ -1 & 0 & 1 \\ -1 & 0 & 1 \end{pmatrix} \text{ and}$$

$$Oy = \begin{pmatrix} 1 & 1 & 1 \\ 0 & 0 & 0 \\ -1 & -1 & -1 \end{pmatrix}$$

where: Ox and Oy are known in the art as Prewitt operators.

The gradient value in the horizontal direction is found by convolving the image, pixel by pixel, with Ox. The vertical gradient value is found by similarly convolving each pixel with Oy. Thus:

$$G = |Ox*r| + |Oy*r|$$

where: G is the gradient value for a given red pixel "r"
* denotes convolution

Gradient values for the green and blue colour components of the image (assuming an RGB colour image) are similarly determined. If a threshold Tg is set, the composite gradient value for each pixel is described by $$G = \begin{cases} G \text{ if } G > Tg \\ O \text{ if } G \leq Tg \end{cases}$$

Finally, the calculated gradient value for the entire frame or the selected region thereof is given by:

$$G(t) = \sum_i \sum_j G/MN$$

where: M and N are the width and height of the image
t is the frame number
i=0, 1, 2, . . . , M−1
j=0, 1, 2, . . . , M−1

Figure 7:
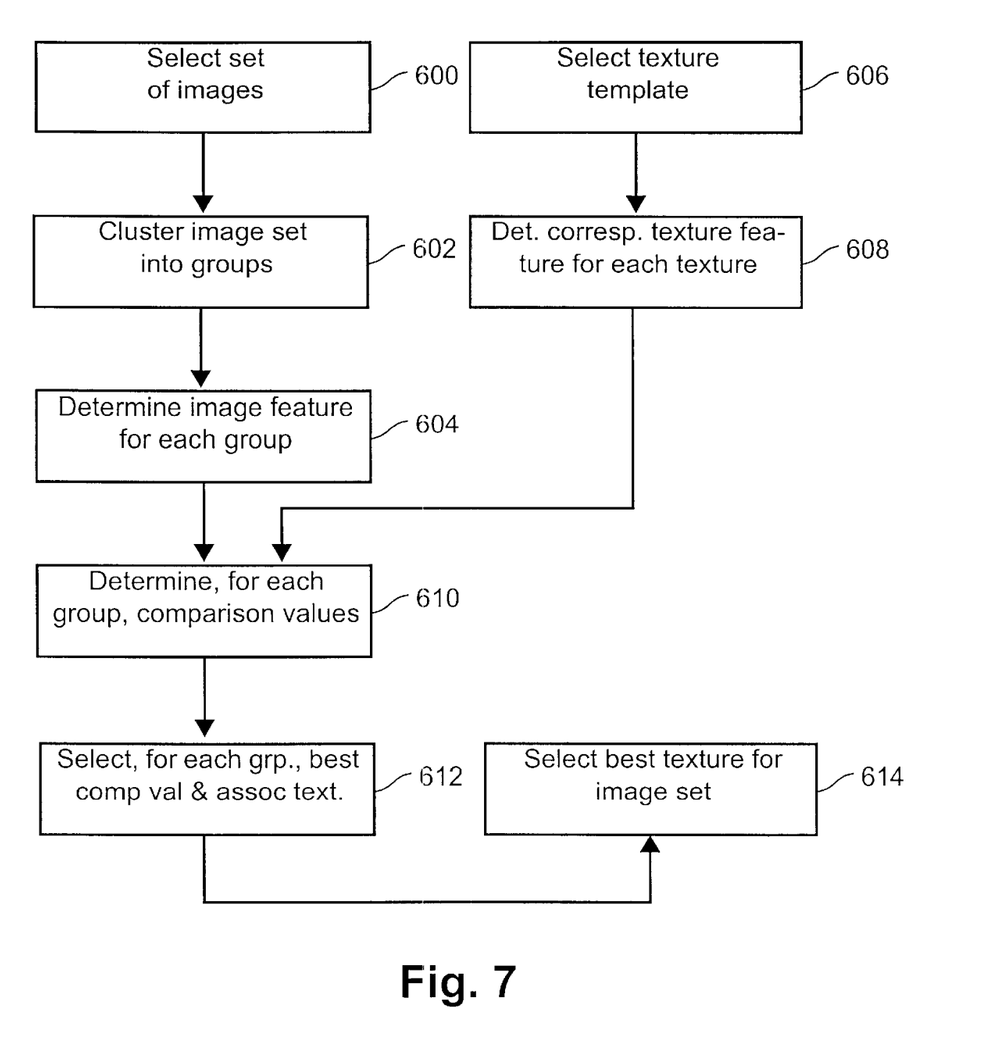
FIG. 7 presents a process in a third embodiment for matching a texture to a clustered sequence of images.

FIG. 7 depicts an alternate method of texture identification for a set of images, such as a sequence of video images. Instead of adopting a time-averaged approach as was described in relation to FIG. 6, the set of images selected in a first step 600 is clustered into say M groups of consecutive images in a step 602 using feature classification. The classification scheme can, for example, be based upon gradient calculation as was used in relation to FIG. 6. In this case, the groups of consecutive images will be clustered according to a set of predetermined gradient value thresholds, where each image having a gradient value falling between two consecutive predefined gradient thresholds is clustered into the same group. In a step 604, a group of image feature value, or in this example a representative gradient value, is determined for each of the M groups, using for example, a time-averaged gradient value across each group. This results in the determination of M representative gradient values, one for each group. A texture template is also selected in a step 606, the selected template having N textures, each texture characterised as belonging to a texture type, as was described in relation to FIG. 1. Since a gradient metric has, in the present example, been selected in the step 602, a gradient texture value is determined in a step 608 for each of the N texture in the texture template selected in the step 606, this resulting in N texture values. Thereafter, each of the N gradient texture values is compared, in a step 610, with the representative gradient value of each of the M image groups, resulting in M sets of N comparison values. In a following step 612, each set of N comparison values is subjected to a relationship rule in order to select the "best" comparison value, and hence the best associated texture, for each of the M groups. After the step 612, the resultant M best textures are subjected, in a step 614, to a second rule in order this time to select the "best" texture in relation to the entire set of images. Although the aforedescribed example has been given in terms of groups comprising consecutive images in a sequence of video images, the images need not, in fact, necessarily be consecutive.

The method described provides a simple process with relatively low computation load which can be applied to image frames or regions thereof selected in step 202 (FIG. 3).

The foregoing describes only some embodiment of the present invention, and modifications obvious to those skilled in the art, can be made thereto without departing from the scope of the persent invention.

What is claimed is:

1. A method for selecting a texture from a set of textures which matches a particular region in an image, said method comprising the steps of:

selecting a relationship rule to establish an aesthetic-based matching criterion;

determining an image feature value from the region;

determining, for members of the set of textures, a texture feature value corresponding to the image feature value, so as to form a set of corresponding texture feature values;

comparing the image feature value with members of the set of corresponding texture feature values, so as to produce a corresponding set of comparison values; and selecting, from the set of comparison values, a comparison value according to the relationship rule, wherein the selected comparison value is associated with the corresponding texture which matches the region, according to the aesthetic-based matching criterion.

2. A method according to claim 1, wherein the image feature value is dependent upon a number of sharply focused edges per unit area in the image.

3. A method according to claim 1, wherein the image feature value is dependent upon high frequency components in a Fourier transform of the image.

4. A method according to claim 1, wherein the image feature value is determined dependent upon the entirety of the image.

5. A method according to claim 1, wherein the image feature value is determined dependent upon a part of the image.

6. A method according to claim 1, wherein the set of textures is determined by applying a second rule to the image feature value.

7. A method according to claim 1, wherein determination of the image feature value comprises the sub-steps of:
   determining a first image feature value for each image in a set of images; and
   determining an average of the first image feature values, so as to form the image feature value.

8. A method according to claim 7, wherein the set of images is a sequence of video images, and wherein the first image feature value is a gradient value, and the image feature value is a time averaged gradient value dependent upon the gradient values for each image.

9. A method for selecting a texture from a set of textures which substantially best matches a particular region in an image that is part of a set of images, said method comprising the steps of:
   selecting a relationship rule to establish an aesthetic-based matching criterion;
   clustering a set of images into groups dependent upon an image feature classification;
   determining a group image feature value for each group;
   determining, for each member of the set of textures, a texture feature value corresponding to each group image feature value, so as to form a set of corresponding texture feature values;
   comparing, for each group of images, the group image feature value with each member of the set of corresponding texture feature values, so as to produce, for each group image feature value, a corresponding set of comparison values;
   selecting, for each group of images, from the corresponding set of comparison values, a best comparison value according to the relationship rule, wherein the selected comparison value is associated with the corresponding texture which substantially best matches, according to the aesthetic-based matching criterion, the associated group image feature value; and
   selecting, from the corresponding textures each of which substantially best matches the group image feature value associated with a corresponding group of images, a best texture according to another rule, the best texture substantially best matching, according to the aesthetic-based matching criterion, the particular region in an image that is part of the set of images.

10. An apparatus for selecting a texture from a set of textures which matches a particular region in an image, said apparatus comprising:
    first selection means for selecting a relationship rule to thereby establish an aesthetic-based matching criterion;
    first determination means for determining an image feature value from the region;
    second determination means for determining, for members of the set of textures, a texture feature value corresponding to the image feature value, so as to form a set of corresponding texture feature values;
    comparison means for comparing the image feature value with members of the set of corresponding texture feature values, so as to produce a corresponding set of comparison values; and
    second selection means for selecting, from the set of comparison values, a comparison value according to the relationship rule, wherein the selected comparison value is associated with the corresponding texture which matches the region, according to the aesthetic-based matching criterion.

11. An apparatus for selecting a texture from a set of textures which substantially best matches a particular region in an image that is part of a set of images, said apparatus comprising:
    first selection means for selecting a relationship rule thereby to establish an aesthetic-based matching criterion;
    clustering means for clustering a set of images into groups dependent upon an image feature classification,
    first determination means for determining a group image feature value for each group;
    second determination means for determining, for each member of the set of textures, a texture feature value corresponding to each group image feature value, so as to form a set of corresponding texture feature values;
    comparison means for comparing, for each group of images, the group image feature value with each member of the set of corresponding texture feature values, so as to produce, for each group image feature value, a corresponding set of comparison values;
    second selection means for selecting, for each group of images, from the corresponding set of comparison values, a best comparison value according to the relationship rule, wherein the selected comparison value is associated with the corresponding texture which substantially best matches, according to the aesthetic-based matching criterion, the associated group image feature value; and
    third selection means for selecting, from the corresponding textures each of which substantially best matches the group image feature value associated with a corresponding group of images, a best texture according to another rule, the best texture substantially best matching, according to the aesthetic-based matching criterion, the particular region in an image that is part of the set of images.

12. A computer program product including a computer readable medium having recorded thereon a computer program selecting a texture from a set of textures which matches a particular region in an image, said computer program comprising:
    code for a first selection step, of selecting a relationship rule to thereby establish an aesthetic-based matching criterion;
    code for a first determination step, of determining an image feature value from the region;
    code for a second determination step, of determining, for members of the set of textures, a texture feature value corresponding to the image feature value, so as to form a set of corresponding texture feature values;
    code for a comparison step, of comparing the image feature value with members of the set of corresponding texture feature values, so as to produce a corresponding set of comparison values; and
    code for a second selection step, of selecting, from the set of comparison values, a comparison value according to the relationship rule, wherein the selected comparison value is associated with the corresponding texture which matches the region, according to the aesthetic-based matching criterion.

13. A computer program product including a computer readable medium having recorded thereon a computer program for selecting a texture from a set of textures which substantially best matches a particular region in an image that is part of a set of images, the computer program comprising:

code for a first selection step, of selecting a relationship rule to thereby establish a matching criterion;

code for a clustering step, of clustering the set of images into groups dependent upon an image feature classification;

code for a first determination step, of determining a group image feature value for each group;

code for a second determination step, of determining, for each member of the set of textures, a texture feature value corresponding to each group image feature value, so as to form a set of corresponding texture feature values;

code for a comparison step, of comparing, for each group of images, the group image feature value with each member of the set of corresponding texture feature values, so as to produce, for each group image feature value, a corresponding set of comparison values;

code for a second selection step, of selecting, for each group of images, from the corresponding set of comparison values, a best comparison value according to the relationship rule, wherein the selected comparison value is associated with the corresponding texture which substantially best matches, according to the aesthetic-based matching criterion, the associated group image feature value; and code for a third selection step, of selecting, from the corresponding textures each of which substantially best matches the group image feature value associated with a corresponding group of images, a best texture according to another rule, the best texture substantially best matching, according to the aesthetic-based matching criterion, the particular region in an image that is part of the set of images.

* * * * *

UNITED STATES PATENT AND TRADEMARK OFFICE
CERTIFICATE OF CORRECTION

PATENT NO.    : 6,751,339 B1                                           Page 1 of 1
DATED         : June 15, 2004
INVENTOR(S)   : John Richard Windle et al.

It is certified that error appears in the above-identified patent and that said Letters Patent is hereby corrected as shown below:

<u>Column 7,</u>
Line 64, "M-1" should read -- N-1 --.

Signed and Sealed this

Twenty-seventh Day of December, 2005

JON W. DUDAS
*Director of the United States Patent and Trademark Office*